United States Patent
York et al.

(10) Patent No.: US 6,452,124 B1
(45) Date of Patent: Sep. 17, 2002

(54) CAPACITIVE MICROELECTROMECHANICAL SWITCHES

(75) Inventors: Robert A. York; Amit S. Nagra; Andrea Borgioli, all of Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/895,105

(22) Filed: Jun. 28, 2001

Related U.S. Application Data
(60) Provisional application No. 60/215,369, filed on Jun. 28, 2000.

(51) Int. Cl.[7] ............................................. H01H 57/00
(52) U.S. Cl. ......................... 200/181; 361/233; 29/622
(58) Field of Search .................... 200/181; 257/295, 257/296, 301, 303, 308, 414, 421, 531; 335/78, 128, 298.1, 298.2, 298.3, 296, 290, 301.4, 306.3, 311, 306.1, 312, 313, 299.2, 321.2–321.4, 233, 234, 235; 438/48, 50; 29/622

(56) References Cited

U.S. PATENT DOCUMENTS

| | | | |
|---|---|---|---|
| RE33,691 E | * 9/1991 | Harnden et al. | 200/181 |
| 5,629,794 A | 5/1997 | Magel | 359/290 |
| 5,638,946 A | 6/1997 | Zavracky | 200/181 |
| 5,677,823 A | 10/1997 | Smith | 361/234 |
| 5,696,662 A | 12/1997 | Bauhahn | 361/298.1 |
| 6,100,477 A | * 8/2000 | Randall et al. | 200/181 |
| 6,115,231 A | * 9/2000 | Shirakawa | 200/181 |
| 6,143,997 A | * 11/2000 | Feng et al. | 200/181 |

OTHER PUBLICATIONS

N.S. Barker et al., "Distributed MEMS True–Time Delay Phase Shifters and Wide–Band Switches," IEEE Transactions on Microwave Theory and Techniques, 1998, 46(11):1881–1890.

N.S. Barker et al., "Optimization of Distributed MEMS Phase Shifters," IEEE MT–S Digest, 1999, pp. 299–302.

E.R. Brown, "RF–MEMS Switches for Reconfigurable Integrated Circuits," IEEE Transactions on Microwave Theory and Techniques, 1998, 46(11):1868–1880.

E.K. Chan et al., "Nonlinear Dynamic Modeling of Micromachined Microwave Switches," IEEE MTT–S Digest, 1997, pp. 1511–1514.

C. Goldsmith et al., "Micromechanicla Membrane Switches for Microwave Applications," IEEE MTT–S Digest, 1995, pp. 91–94.

C. Goldsmith et al., "Characteristics of Micromachined Switches at Microwave Frequencies," IEEE MTT–S Digest, 1996, pp. 1141–1144.

C.L. Goldsmith et al., "Performance of Low–Loss RF MEMS Capacitive Switches," IEEE Microwave and Guided Wave Letters, 1998, 8(8):269–271.

V. Milanovic et al. "Micromachined Microwave Transmission Lines in CMOS Technology," IEEE Transactions on Microwave Theory and Techniques, 1997, 45(5):630–635.

(List continued on next page.)

*Primary Examiner*—Michael Friedhofer
(74) *Attorney, Agent, or Firm*—Gates & Cooper LLP

(57) ABSTRACT

A microelectromechanical switch is disclosed comprising a conductor, a dielectric layer disposed on the conductor, a metal cap disposed on the dielectric layer and a bridge disposed proximate to the metal cap such that an electrical potential applied between the bridge and conductor causes the bridge to deform and contact the metal cap.

20 Claims, 4 Drawing Sheets

OTHER PUBLICATIONS

J.B. Muldavin et al., "30 GHz Tuned MEMS Switches," IEEE MTT–S Digest, 1999, pp. 1511–1514.

C.T.–C. Nguyen et al., "Micromachined Devices for Wireless Communications," Proceedings of the IEEE, 1998, 86(8):1756–1768.

S. Pacheco et al., "Micromechanical Electrostatic K–Band Switches," IEEE MTT–S Digest, 1998, pp. 1569–1572.

H.J. De Los Santos et al., "Microwave and Mechanical Considerations in the Design of MEM Switches for Aerospace Applications," IEEE, 1997, pp. 235–254.

J.J. Yao et al., "A Surface Micromachined Miniature Switch for Telecommunications Applications with Signal Frequencies from DC up to 4 GHZ," Transducers '95 Eurosensors IX, 1995, pp. 384–387.

Z.J. Yao et al., "Micromachined Low–Loss Microwave Switches," IEEE Journal of Microelectromechanical Systems, 1999, 8(2):129–134.

L.E. Larson et al., "Micromachined Microwave Actuator (MIMAC) Technology—A New Tuning Approach for Microwave Integrated Circuits," IEEE, 1991, pp. 27–30.

K.E. Peterson, "Micromechanical Membrane Switches on Silicon," IBM J. Res. Develop., 1979, 13(4):376–385.

* cited by examiner

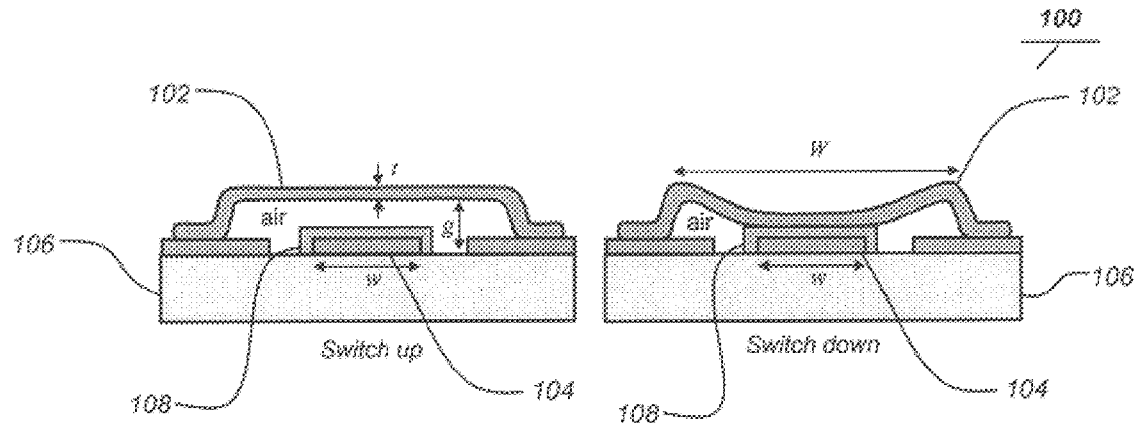
FIG. 1A  FIG. 1B
*PRIOR ART*
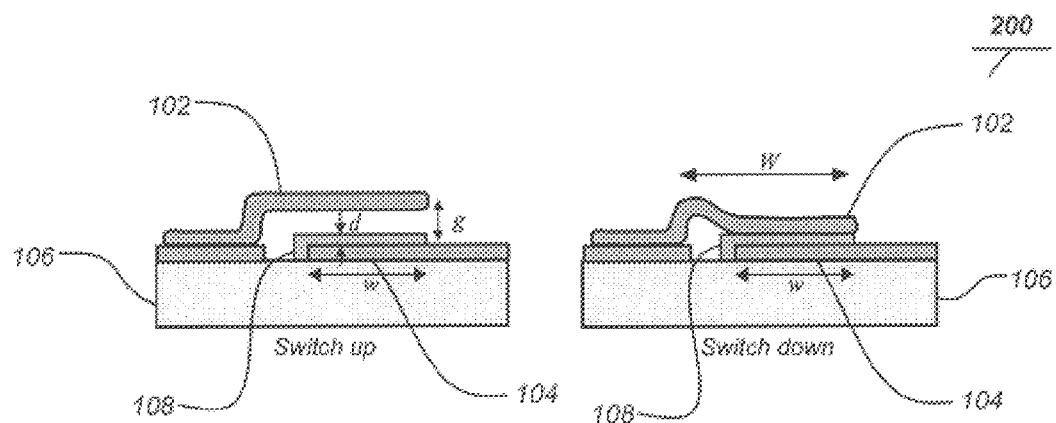
FIG. 2A  FIG. 2B
*PRIOR ART*

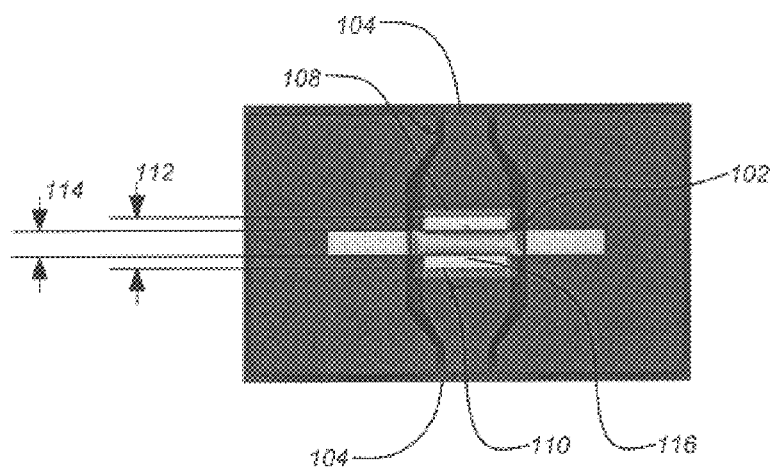
FIG. 5
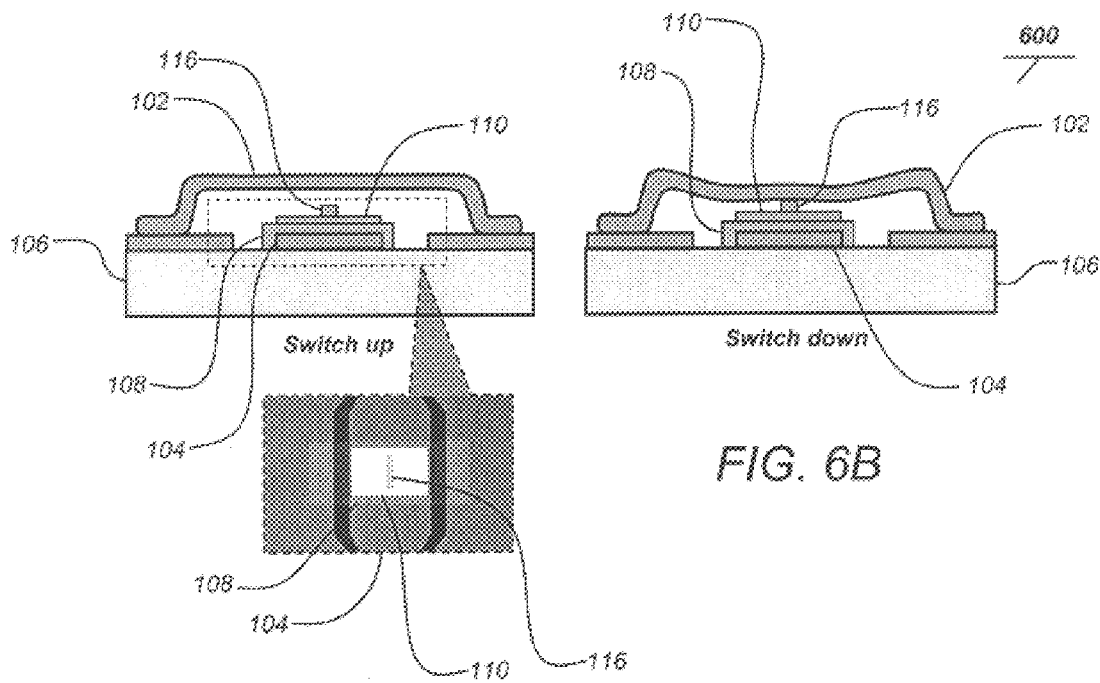
FIG. 6A
FIG. 6B

CAPACITIVE MICROELECTROMECHANICAL SWITCHES

CROSS-REFERENCE TO RELATED APPLICATIONS

This application claims priority under 35 U.S.C. §119(e) to U.S. Provisional Patent Application No. 60/215,369, filed Jun. 28, 2000, by Robert A. York, Amit Nagra and Andrea Borgioli, and entitled "IMPROVED CAPACITIVE MICROELECTROMECHANICAL SWITCHES," which application is incorporated by reference herein.

STATEMENT REGARDING FEDERALLY SPONSORED RESEARCH OR DEVELOPMENT

This invention was made with Government support under Grant No. DABT63-98-1-0006 and F19628-99-C-0017, awarded by the Navy and the Defense Advanced Research Project Agency. The Government has certain rights in this invention.

BACKGROUND OF THE INVENTION

1. Field of the Invention

The present invention relates to microelectromechanical switches and particularly to capacitive microelectromechanical switches.

2. Description of the Related Art (Note: This application references a number of different publications as indicated throughout the specification by reference numbers enclosed in brackets, e.g., [Ref. x]. A list of these different publications ordered according to these reference numbers can be found below at the end of the Detailed Description of the Preferred Embodiment. Each of these publications is incorporated by reference herein.)

Microelectromechanical (MEMS) switches rival the performance of conventional solid-state switching devices, such as positive-intrinsic-negative (PIN) semiconductor diodes and gallium arsenide field effect transistors (GaAs FETs), but at lower costs. In addition, one advantage of using MEMS is their very low additional transmission line loss and distortion.

MEMS switches are micromechanical switches where the active element is a thin metallic membrane movable through the application of a direct current (DC) electrostatic field. These devices have been developed to perform switching of electrical signals with high performance. Currently they are an established technology with great promise for reducing cost and improving performance in certain microwave and millimeter-wave applications.

MEMS switches were first demonstrated in 1979 [Ref. 1] as electrostatically actuated cantilever structures used to perform switching of electrical signals at low frequency. Since then, these switches have demonstrated useful performance at RF and microwave frequencies using cantilever [Ref. 2], rotary [Ref. 3], and membrane [Ref. 4] topologies. Over the past years, the development of radio frequency (RF) MEMS switches with capacitive coupling has been reported by several researchers [Ref. 5–15].

Such capacitive MEMS switches may be implemented using a dielectric layer to effect capacitive coupling when the switch is in the closed position. A crucial factor for the performance of a MEMS switch is the quality of the effective contact of the upper membrane or bridge with the bottom electrode when actuated. It is easy to understand that an imperfect effective contact creates non-predictable electrical behaviors, especially in the value of the achievable closed state capacitance of the switch. Low insertion loss performance can also be seriously deteriorated by a 'non-intimate' contact between the two electrodes. There are several factors that limit the contact. One cause is an air gap created by hillocking in the metal films. Hillocking is a stress relief mechanism that occurs when a metallic thin film is exposed to high temperature. It is often difficult to avoid the formation of roughness on the film and to obtain a perfectly smooth surface [Ref. 16].

There is a need for improved effective contact quality between the bridge and conductor in MEMS switches. There is also a need to create stable and predictable behavior in MEMS switch capacitance to improve performance, particularly in the closed state. There is further a need to minimize the negative effects of hillocking on MEMS switch electrodes. The present invention meets these needs.

SUMMARY OF THE INVENTION

The present invention offers the potential for building a new generation of low-loss high-linearity microwave circuits for a variety of radar and communication applications. A microelectromechanical switch is disclosed comprising a conductor, a dielectric layer disposed on the conductor, a metal cap disposed on the dielectric layer and a bridge disposed proximate to the metal cap such that an electrical potential applied between the bridge and conductor causes the bridge to deform and contact the metal cap.

The metal cap presents a stable, controlled surface proximate to the conductor which is used to precisely control the MEMS switch capacitance in the closed or DOWN state. In the DOWN state, the bridge contacts the metal cap and the metal cap principally defines the effective contact between the bridge and conductor. Thus, the present invention creates a greatly improved effective contact between the bridge and conductor through an intervening stable and controllable metal cap.

BRIEF DESCRIPTION OF THE DRAWINGS

Referring now to the drawings in which like reference numbers represent corresponding parts throughout:

FIGS. 1A and 1B illustrate a MEMS membrane configuration;

FIGS. 2A and 2B illustrate a MEMS cantilever configuration;

FIG. 5 is a detailed image of an embodiment of the invention;

FIGS. 6A and 6B depict a variation of the invention using a 'notch' configuration 600.

DETAILED DESCRIPTION OF THE PREFERRED EMBODIMENT

Figures 3A, 3B:
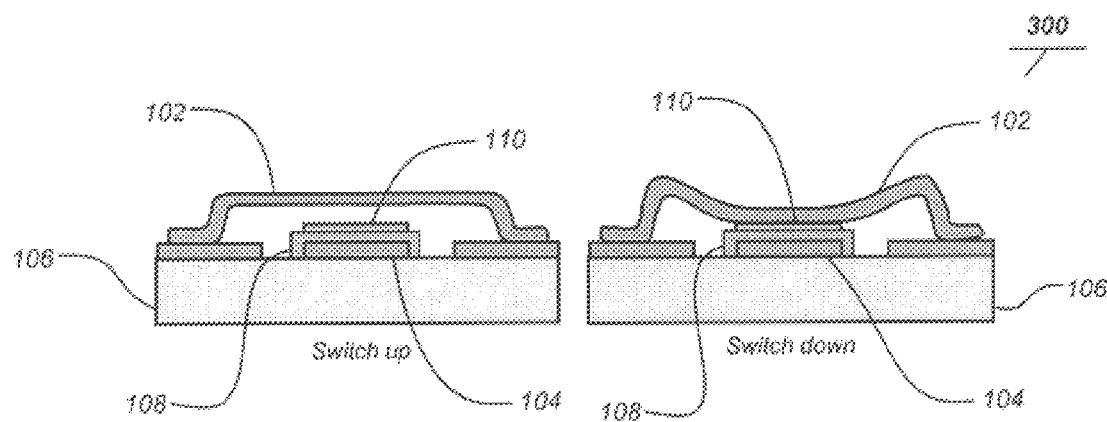
FIGS. 3A and 3B illustrate an embodiment in a membrane configuration 300.

In the following description, reference is made to the accompanying drawings which form a part hereof, and which show, by way of illustration, a preferred embodiment of the present invention. It is understood that other embodiments may be utilized and structural changes may be made without departing from the scope of the present invention.

Technical Description

FIGS. 1A–2B depict some typical structures of MEMS switching devices. FIGS. 1A and 1B illustrate a MEMS membrane configuration 100. FIGS. 2A and 2B illustrate a MEMS cantilever configuration 200. Regardless of the configuration, the basic principle consists of a thin metal bridge 102 of thickness t suspended at a short distance g above a conductor 104, the device typically being formed on a substrate 106. When a DC potential is applied between the bridge 102 and the conductor 104, charges are induced on the bridge 102 and conductor 104 which tend to attract the two elements 102, 104. Above a certain threshold voltage, the force of attraction is sufficient to overcome mechanical stresses in the bridge 102 material, and the bridge 102 snaps down to the "closed" position as shown in FIGS. 1B and 2B. It can be shown through simple force-balance laws that the "pull-down" voltage $V_p$ for the MEMS switch 100, 200 is given by:

$$V_p = \sqrt{\frac{8K_s g_0^3}{27\varepsilon_0 w}} \quad (1)$$

where $\varepsilon_0$ is the free-space permittivity, $g_0$ is the bridge 102 height at zero bias, w is the center conductor 104 width, and $K_s$ is a "spring" constant that is related to the Young's modulus and Poisson's ratio of the bridge 102 metal, and residual stresses in the bridge 102 switch body.

A thin dielectric layer 108 of material is deposited on the bottom conductor 104 to prevent the stiction with the upper bridge 102. This creates a capacitive coupling and, in most applications, the value of the capacitance in the DOWN state. i.e. with the bridge 102 electrode pulled down, is such that the switch creates a short circuit at a predetermined frequency. In order to generate an effective short circuit at a certain frequency it is crucial that the value of the capacitance of the switch in the DOWN state is large enough for the operating frequency. For a lower operating frequency, a larger value of DOWN state capacitance is required for an effective short circuit.

Nevertheless, a critical parameter to be carefully considered in the design is the ratio between the value of the capacitance in the DOWN state and the value of the capacitance in the UP state, i.e. with the bridge 102 electrode up. The higher this ratio is, the more the switch can discriminate the DOWN state from the UP state. It is worthwhile to notice that simply scaling the size of the MEMS switches would not be a viable alternative for achieving high capacitive ratios because it would increase the value of both the DOWN and UP capacitances in the same proportion. In addition, this possibility is limited by practical considerations; a very large suspended bridge 102 is more likely to have structural non-uniformities; the parasitic effects will also become more important. The height g of the metal bridge 102 above the central conductor 104 and the dielectric layer 108 coating the central conductor 104 are instead essential in determining the DOWN/UP capacitance ratio.

High values of capacitance ratios maybe achieved (e.g. see FIGS. 1A–2B) through a few techniques, a) increasing the height g of the metal bridge 102 above the central conductor 104, b) reducing the thickness d of the dielectric layer 108 coating the bottom conductor 104, or c) increasing the dielectric constant $\varepsilon_r$ of the dielectric layer 108 coating the bottom conductor 104. Each of these techniques, however, is less than ideal.

Increasing the height of the metal bridge 102 above the central conductor 104 has an intrinsic drawback: the pull-down voltage is strongly dependent by the height g of the upper bridge 102 (see the formula for the actuation voltage above). The higher g, the higher is the voltage required. Most applications in wireless and/or space/airborne systems require low actuation voltages. In addition, keeping the height of the bridge 102 to the smallest possible value is recommended for better reliability.

Similarly, reducing the thickness d of the dielectric layer 108 coating the bottom conductor 104 can only be useful to a certain point. A thinner dielectric layer 108 has a lower breakdown voltage. Typically, less than 1000 Angstroms of Silicon Nitride, commonly used as coating dielectric for MEMS structures, would approach the limit of a viable and practical choice.

Finally, increasing the dielectric constant $\varepsilon_r$ of the dielectric layer 108 coating the bottom electrode entails practical difficulties inherent to the growth of such material. High dielectric materials (such as Barium Strontium Titanate) are often difficult to deposit, requiring high growth temperatures, and they have relatively high dielectric losses. Typical dielectric materials employed up to today are Silicon Nitride ($Si_xN_y$) and Silicon Dioxide ($SiO_2$). The present invention employs an alternative to these options to obtain an increased DOWN/UP capacitance ratio and improve MEMS switch performance.

Figures 4A, 4B:
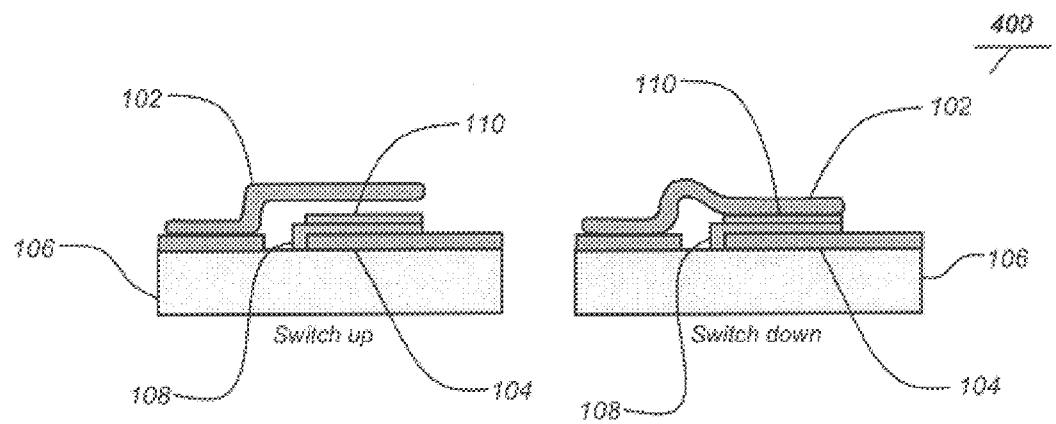
FIGS. 4A and 4B illustrate an embodiment in cantilever configuration 400.

FIGS. 3A–4B illustrate some typical embodiments of the present invention. FIGS. 3A–3B illustrate an embodiment in a membrane configuration 300. FIGS. 4A–4B illustrate an embodiment in cantilever configuration 400. In the present invention, an extra metal cap 110 layer is added on top of the dielectric layer 108. (See FIGS. 3–5). Since the metal to form the metal cap 110 can be evaporated and patterned directly onto the dielectric layer 108 material, intimate contact is assured. With this novel configuration, when the upper bridge 102 snaps down, it creates an electrical contact with this extra metal cap 110 layer and not with the dielectric layer 108 film.

FIG. 5 is a detailed image of an embodiment of the invention. This feature of the present invention offers several advantages. The roughness of the upper surface of the dielectric layer 108 is not a critical factor any longer, because the contact is guaranteed to be nearly perfect by the evaporated metal cap 110 layer. In addition, since the value of the DOWN state capacitance is now determined by the area of the metal cap 110, the size of the bridge 102 does not affect the DOWN state capacitance any longer. Therefore, the design of the bridge 102 may be optimized for the UP state independently of the DOWN state, unlike the traditional design (compare FIGS. 1 and 2 with 3 and 4). Moreover, the dielectric layer 108 film can now be grown much thicker, because the value of the final DOWN state capacitance can be increased by extending the area of the metal cap 110. The extended area 112 of the metal cap 110 beyond the area 114 of the bridge 102 is shown in FIG. 2. A thicker dielectric layer 108 film means a higher breakdown voltage and therefore a much more reliable device. Improved designs of MEMS switches with the present invention open extraordinary potential for better performance for low-loss, microwave and millimeter-wave control circuits.

FIGS. 6A and 6B depict a variation in practicing the invention using a 'notch' configuration 600. FIG. 6A illustrates the switch in the UP state and FIG. 6B illustrates the switch in the DOWN state. In this embodiment a notch 116 is disposed on the metal cap 110.This 'notch-cap' configuration reduces the swing necessary by the bridge 102 to create an electrical contact with the bottom electrode, still maintaining the advantages described above due to the presence of the extra metal cap 110 layer.

Figure 7:
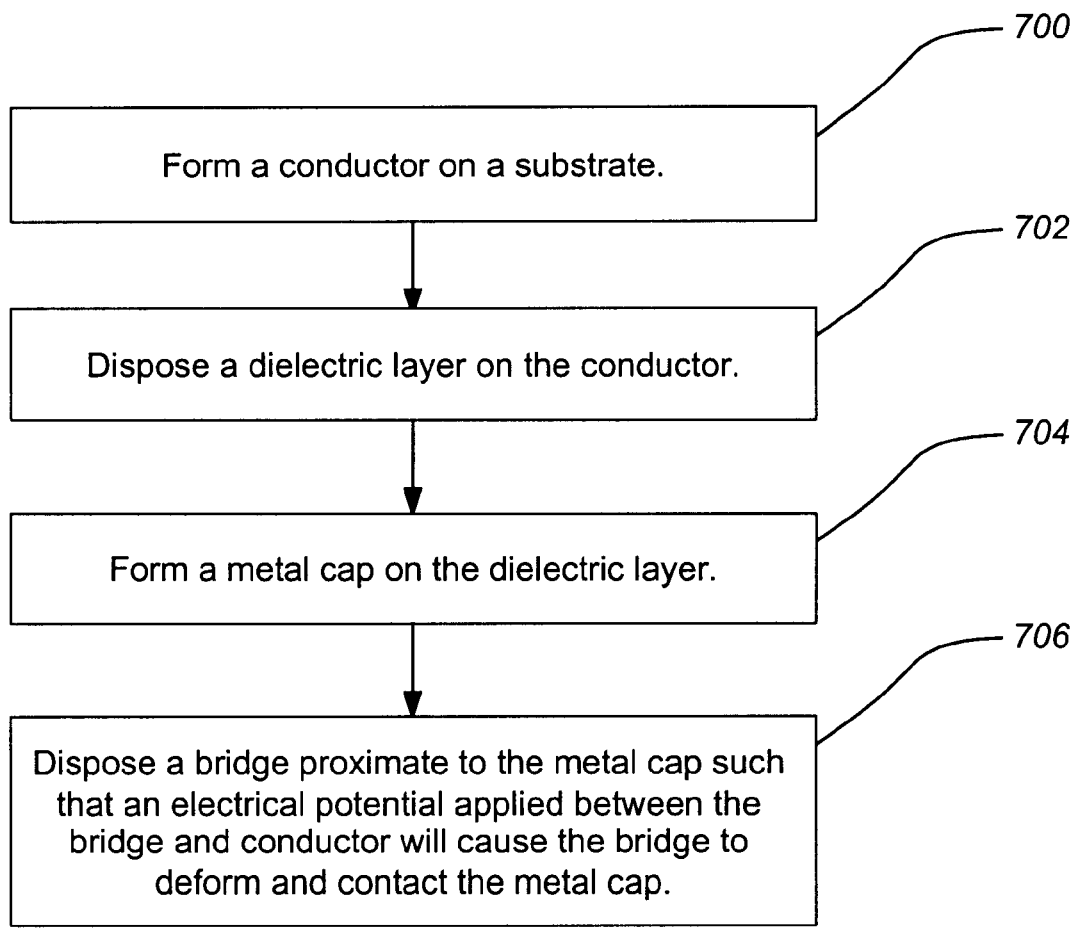
FIG. 7 is a flow chart of a method of producing a microelectromechanical switch of the present invention.

FIG. 7 is a flow chart of a method of producing a microelectromechanical switch of the present invention. A conductor 104 is formed on a substrate 106 at block 700. Following this, a dielectric layer 108 is disposed on the conductor 104 at block 702. Then, a metal cap 110 is formed on the dielectric layer 108 at block 704. Finally, at block 706, a bridge 102 is disposed proximate to the metal cap 110 such that an electrical potential applied between the bridge 102 and the conductor 104 will cause the bridge 102 to deform and contact the metal cap 110. A device implementing the present invention may be formed using conventional techniques known to those skilled in the art.

CONCLUSION

This concludes the description including the preferred embodiments of the present invention. Adding an extra cap layer to the typical fabrication process for MEMS switches presents an excellent potential for high performance, low-cost switching techniques for RF, microwave millimeter-wave control systems. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

REFERENCES

The following references are all incorporated by reference herein:

[1] K. E. Petersen, "Microelectromechanical Membrane Switches on Silicon," IBM J. Res. Develop., Vol. 23, No. 4, July 1979.

[2] Yao, J. J.; Chang, M. F., "A surface micromachined miniature switch for telecommunication applications with signal frequencies from DC up to 4 GHz," TRANSDUCERS '95, pp.384–387, June 1995.

[3] Larson, L. E.; Hackett, R. H.; Melendes, M. A.; Lohr, R. F. , "Micromachined microwave actuator (MIMAC) technology-A new tuning approach for microwave integrated circuits," IEEE Microwave and Millimeter-Wave Monolithic Circuits Symposium, pp.27–30, 1991.

[4] C. Goldsmith, T. H. Lin, B. Powers, W. R. Wu, B. Norvell, "Micromechanical Membrane Switches for Microwave Applications," IEEE MTT-S Digest, pp. 91–94, 1995.

[5] S. Pacheco, C. T. Nguyen, and L .P. B. Kathei, "Micromechanical Electrostatic K-Band Switches," 1998 IEEE MTT-S Digest, pp. 1569–1572.

[6] N. S. Barker and G. Rebeiz, "Distributed MEMS True-Time Delay Phase Shifters and Wide Band Switches," IEEE Trans. Microwave Theory Tech., Vol. 46, No. 11, pp. 1881–1889, November, 1998.

[7] V. Milanovic, M. Gaitan, E. D. Bowen, M. E. Zaghloul, "Micromachined Microwave Transmission Lines in CMOS Technology," IEEE Trans. Microwave Theory Tech., Vol. 45, No. 5, pp. 630–635, May, 1997.

[8] J. B. Muldavin, G. M. Rebeiz, "30 GHz Tuned MEMS Switches," 1999 IEEE MTT Symposium, July, 1999.

[9] C. Goldsmith, J. Randall, S. Eshelman, T. H. Lin, D. Denniston, S. Chen, B. Norvell, "Characteristics of Micromachined Switches at Microwave Frequencies," 1996 IEEE MTT-S Digest, pp. 1141–1144.

[10] C. Goldsmith, Z. Yao, S. Eshelman, D. Denniston, "Performance of Low-Loss RF MEMS Capacitive Switches," IEEE Microwave and Guided Wave Letters, Vol. 8, No. 8, pp. 269–271, August, 1998.

[11] C. T. Nguyen, L. P. B. Kathei and G. Rebeiz, "Micromachined Devices for Wireless Communications," Proceedings of the IEEE, Vol. 86, No. 8, pp. 1756–1768, August, 1998.

[12] E. Brown, "RF-MEMS Switches for Reconfigurable Integrated Circuits," IEEE Trans. Microwave Theory Tech., Vol. 46, No. 11, pp. 1868–1880, November, 1998.

[13] E. K. Chan, E. C. Kan, R. W. Dutton, P. M Pinsky, "Nonlinear Dynamic Modeling of Micromachined Switches," 1997 IEEE MTT-S Digest, pp. 1511–1514.

[14] H. J. De Los Santos, Y. H. Kao, A. L. Caigoy, E. D. Ditmars, "Microwave and mechanical considerations in the design of MEM switches for aerospace applications," 1997 IEEE Aerospace Conference Proceedings, pp.235–254.

[15] N. S. Barker and G. Rebeiz, "Optimization of distributed MEMS phase shifters," IEEE MTT-S Symposium Digest, pp.299–302, Vol.1, June 1999.

[16] Z. J. Yao, S. Chen, S. Eshelman, D. Denniston and C. Goldsmith, "Micromachined Low-Loss Microwave Switches" IEEE Journal of Microelectromechanical Sytems, vol. 8, no. 2, pp. 129–134, June 1999.

What is claimed is:

1. A microelectromechanical switch, comprising:
   a conductor;
   a dielectric layer disposed on the conductor;
   a metal cap disposed on the dielectric layer; and
   a bridge disposed proximate to the metal cap such that an electrical potential applied between the bridge and the conductor causes the bridge to deform and contact the metal cap.

2. The microelectromechanical switch of claim 1, wherein the bridge is a cantilever.

3. The microelectromechanical switch of claim 1, wherein the bridge is a membrane.

4. The microelectromechanical switch of claim 1, wherein the dielectric layer creates capacitive coupling when the bridge is deformed to contact the metal cap to produce an effective short at a predetermined frequency.

5. The microelectromechanical switch of claim 1, wherein the dielectric layer is thickened, thereby increasing a breakdown voltage of the switch.

6. The microelectromechanical switch of claim 1, wherein the metal cap is patterned directly onto the dielectric layer.

7. The microelectromechanical switch of claim 1, wherein the metal cap has an extended area beyond an area of bridge.

8. The microelectromechanical switch of claim 1, wherein a DOWN state capacitance is determined by an area of the metal cap.

9. The microelectromechanical switch of claim 1, wherein the metal cap includes a notch proximate to the bridge.

10. The microelectromechanical switch of claim 9, wherein the bridge contacts the notch of the metal cap when deformed.

11. A method of producing a microelectromechanical switch, comprising the steps of:

forming a conductor on a substrate;

disposing a dielectric layer on the conductor;

forming a metal cap on the dielectric layer; and disposing a bridge proximate to the metal cap such that an electrical potential applied between the bridge and the conductor causes the bridge to deform and contact the metal cap.

12. The method of claim 11, wherein the bridge is a cantilever.

13. The method of claim 11, wherein the bridge is a membrane.

14. The method of claim 11, wherein the dielectric layer creates capacitive coupling when the bridge is deformed to contact the metal cap to produce an effective short at a predetermined frequency.

15. The method of claim 11, wherein the dielectric layer is thickened thereby increasing a break-down voltage of the switch.

16. The method of claim 11, wherein the metal cap is patterned directly onto the dielectric layer.

17. The method of claim 11, wherein the metal cap has an extended area beyond an area of bridge.

18. The method of claim 11, wherein a DOWN state capacitance is determined by an area of the metal cap.

19. The method of claim 11, wherein the metal cap includes a notch proximate to the bridge.

20. The method of claim 19, wherein the bridge contacts the notch of the metal cap when deformed.

* * * * *